US011054313B2

(12) United States Patent
Sun et al.

(10) Patent No.: US 11,054,313 B2
(45) Date of Patent: Jul. 6, 2021

(54) FAR INFRARED SENSOR APPARATUS HAVING MULTIPLE SENSING ELEMENT ARRAYS INSIDE SINGLE PACKAGE

(71) Applicant: PixArt Imaging Inc., Hsin-Chu (TW)

(72) Inventors: Chih-Ming Sun, Hsin-Chu (TW); Sen-Huang Huang, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 40 days.

(21) Appl. No.: 15/394,844

(22) Filed: Dec. 30, 2016

(65) Prior Publication Data

US 2018/0058936 A1    Mar. 1, 2018

(30) Foreign Application Priority Data

Aug. 30, 2016   (TW) .................. 105127775

(51) Int. Cl.
| *G01J 5/10* | (2006.01) |
| *G01J 5/12* | (2006.01) |
| *G01J 1/02* | (2006.01) |
| *G01J 5/04* | (2006.01) |
| *G01J 1/42* | (2006.01) |
| *G01J 5/08* | (2006.01) |
| *G01J 5/14* | (2006.01) |
| *G01J 5/00* | (2006.01) |

(52) U.S. Cl.
CPC .............. *G01J 5/12* (2013.01); *G01J 1/0271* (2013.01); *G01J 1/4228* (2013.01); *G01J 5/045* (2013.01); *G01J 5/0853* (2013.01); *G01J 5/10* (2013.01); *G01J 5/14* (2013.01); *G01J 2005/0077* (2013.01); *G01J 2005/123* (2013.01)

(58) Field of Classification Search
CPC .............. G01J 5/12; G01J 5/14; G01J 5/0853
See application file for complete search history.

(56) References Cited

U.S. PATENT DOCUMENTS

| 5,109,158 | A | * | 4/1992 | Horne | .................. | H04N 3/1593 |
| | | | | | | 250/332 |
| 5,689,087 | A | * | 11/1997 | Jack | .......................... | G01J 5/12 |
| | | | | | | 136/213 |
| 6,806,514 | B1 | | 10/2004 | Tian | | |
| 2011/0155914 | A1 | | 6/2011 | Ohhira | | |
| 2012/0085910 | A1 | * | 4/2012 | Kryskowski | .............. | G01J 5/14 |
| | | | | | | 250/349 |
| 2012/0193537 | A1 | * | 8/2012 | Booker | ............. | H01L 27/14634 |
| | | | | | | 250/349 |
| 2014/0138543 | A1 | * | 5/2014 | LaVeigne | .................. | G01J 5/20 |
| | | | | | | 250/338.1 |
| 2016/0323523 | A1 | | 11/2016 | Chiang | | |

FOREIGN PATENT DOCUMENTS

| CN | 102141444 A | 8/2011 |
| CN | 202188910 U | 4/2012 |
| CN | 203881450 U | 10/2014 |
| CN | 205157051 U | 4/2016 |
| TW | 554544 | 9/2003 |
| WO | 2014/082097 A1 | 5/2014 |

* cited by examiner

Primary Examiner — David P Porta
Assistant Examiner — Shun Lee
(74) Attorney, Agent, or Firm — Winston Hsu

(57) ABSTRACT

A far infrared sensor package includes a package body and a plurality of far infrared sensor array integrated circuits. The plurality of far infrared sensor array integrated circuits are disposed on a same plane and inside the package body. Each of the far infrared sensor array integrated circuits includes a far infrared sensing element array of a same size.

11 Claims, 8 Drawing Sheets

FAR INFRARED SENSOR APPARATUS HAVING MULTIPLE SENSING ELEMENT ARRAYS INSIDE SINGLE PACKAGE

BACKGROUND OF THE INVENTION

1. Field of the Invention

The present invention relates to infrared detection, and more particularly, to a far infrared sensing device having multiple far infrared sensing element arrays combined and arranged in a single package.

2. Description of the Prior Art

Typically, in order to detect distribution of thermal radiation, it needs a sensor with sensing elements of array structure to measure infrared light radiating over the space. FIG. 1 illustrates a conventional infrared sensor package 100 including an 8×8 sensing element array. The infrared sensor package 100 comprises a package body 110, a filter 120, an infrared sensor array integrated circuit 130 and a circuit board 140. The infrared sensor array integrated circuit 130 comprises a sensing element array 135 and a control circuit (not shown) for controlling operations of the sensing element array 135.

Thermal radiation is the emission of electromagnetic waves. Therefore, only the light with specific temperature range (e.g. specific wavelength) can pass through the filter 120. When the infrared light applies onto the sensing element array 135, each sensing elements therein have physical changes at different extents. The physical changes will be further converted to electrical signals. Taking the thermopile sensing element as an example, the infrared light is absorbed by the sensing element and converted to thermal energy. The thermal energy will lead to potential difference between two terminals of the sensing element. Then, the sensing control circuit can detect the potential difference, thereby obtaining the sensed signal.

When sensors suppliers manufacture the sensing element array, such as the sensing element array 135, they may produce sensing element arrays having different dimensions in order to meet different customers' requirements. This means sensors suppliers have to set up production lines dedicated to different sensor dimensions. However, different production lines lead to lower overall productivity and higher manufacturing costs.

SUMMARY OF THE INVENTION

In order to improve the flexibility and efficiency in manufacturing and reduce the manufacturing costs, the present invention proposes an innovative design approach of the infrared sensor array, which facilitates realizing the modular design and modular production for the infrared sensor.

According to one embodiment of the present invention, a far infrared sensor package is provided. The far infrared sensor package includes a package body and a plurality of far infrared sensor array integrated circuits. The plurality of far infrared sensor array integrated circuits are disposed on a same plane and inside the package body. Each of the far infrared sensor array integrated circuits includes a far infrared sensing element array of a same size.

According to another embodiment of the present invention a far infrared sensor array integrated circuit combination is provided. The far infrared sensor array integrated circuit combination comprises: a first far infrared sensor array integrated circuit and a plurality of second far infrared sensor array integrated circuits. The first far infrared sensor array integrated circuit comprises a first far infrared sensing element array and a first sensing control circuit. At least one of the second far infrared sensor array integrated circuits comprises a second far infrared sensing element array and a second sensing control circuit. A function providable by the first sensing control circuit is different from functions providable by the second sensing control circuit, and a size of the first far infrared sensing element array is consistent with a size of the second far infrared sensing element array.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following descriptions and claims to refer to particular system components. As one skilled in the art will appreciate, manufacturers may refer to a component by different names. This document does not intend to distinguish between components that differ in name but not differ in functionality. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections.

Figure 1:
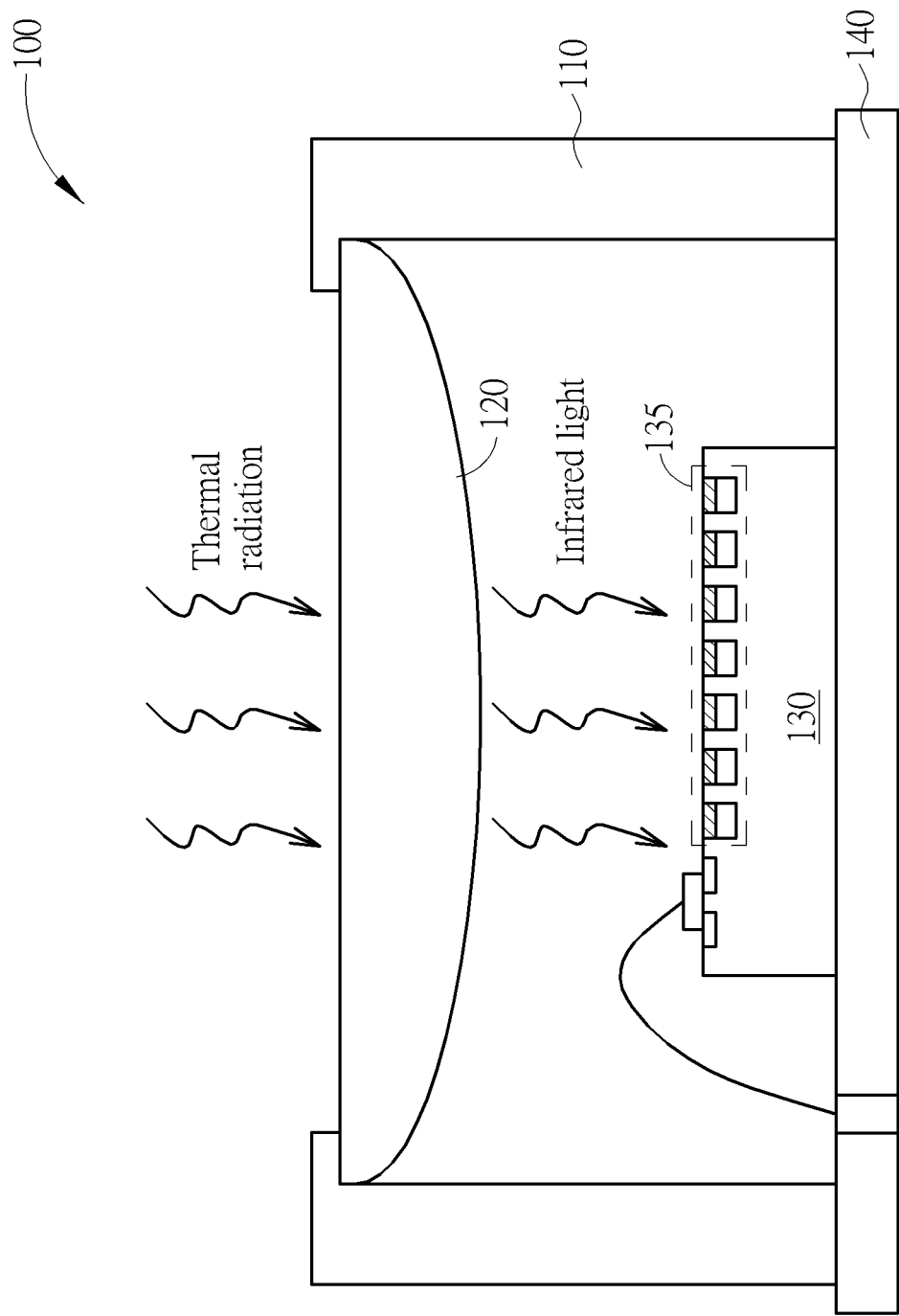
FIG. 1 illustrates structure of a conventional infrared sensor package.
Figure 2:
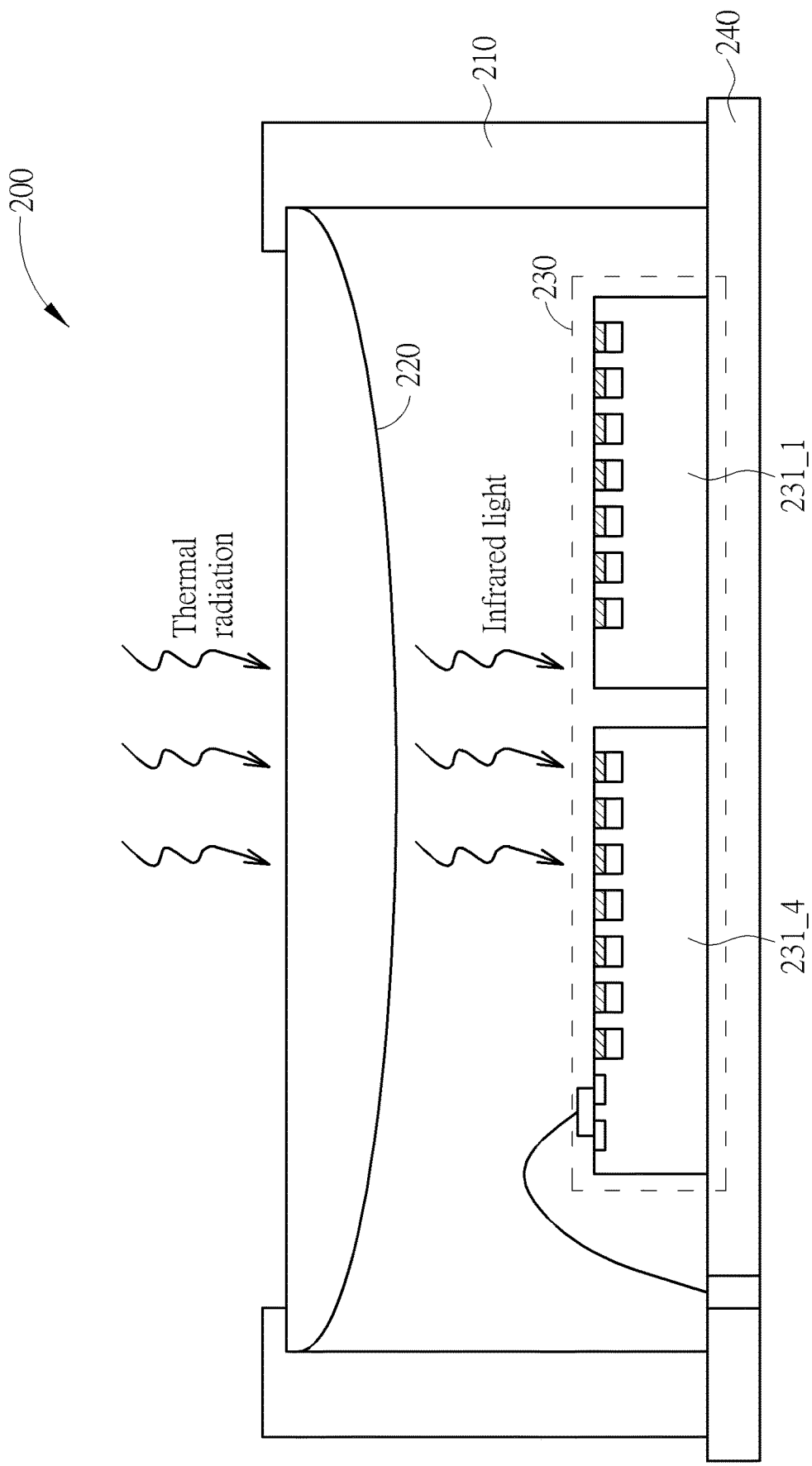
FIG. 2 illustrates structure of a far infrared sensor package according to one embodiment of the present invention.
Figure 3:
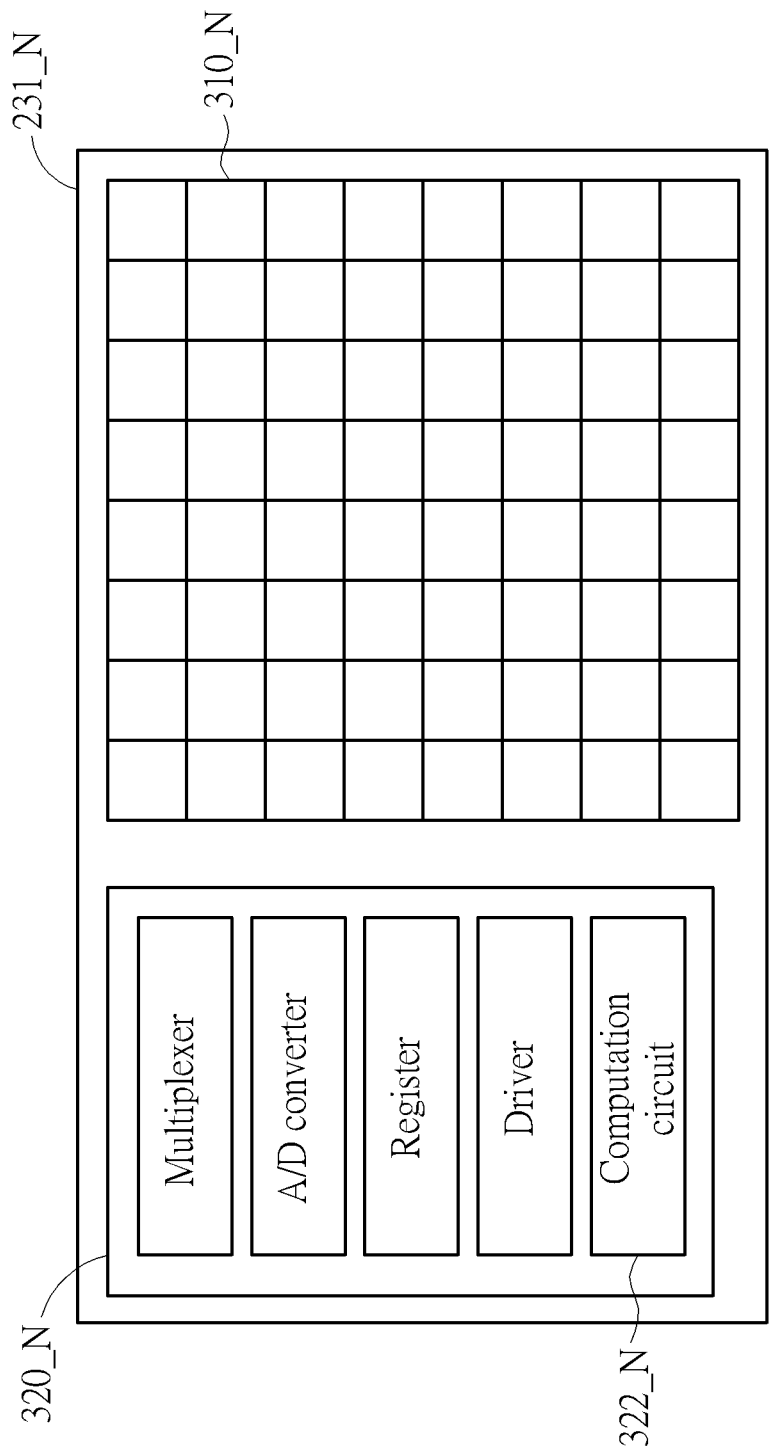
FIG. 3 illustrates a simplified diagram of a far infrared sensor array integrated circuit according to one embodiment of the present invention.

FIG. 2 illustrates a sectional view of structure of a far infrared sensor package according to one embodiment of the present invention. As illustrated, a far infrared sensor package 200 has a package body 210, an optical element 220, a far infrared sensor array integrated circuit combination 230 and a circuit board 240. The far infrared sensor array integrated circuit combination 230 comprises a plurality of far infrared sensor array integrated circuits 231_1-231_N that are substantially mounted on a same plane. At least one of the far infrared sensor array integrated circuits 231_1-231_N is basically as illustrated by FIG. 3, and includes a far infrared sensing element array 310_N and a sensing control circuit 320_N. The far infrared sensing element array 310_N comprises a plurality of sensing elements that are arranged in form of array. Please note that the far infrared sensing element array 310_N is described as an 8×8 sensing element array in the following descriptions. However, this is just intended for illustrative purposes rather than limitations. The optical element 220 is lens having specialized coatings thereon. When the thermal radiation applies on the optical element 220, the infrared light with specific temperatures/ wavelengths could pass through. Each sensing element in the far infrared sensing element array 310_N will have physical change corresponding to the intensity of received infrared light, thereby forming a sensed signal. The sensing control circuit 320_N is utilized for (but not limited to) controlling a driving operation regarding each sensing element and a reading operation regarding the sensed signal of each sensing element in the far infrared sensing element array 310_N. Additionally, the sensing control circuit 320_N may comprise (but not limited to) a driver, a multiplexer, an analog-to-digital converter and a register for facilitating the driving and reading operation as well as a computation circuit for performing a compensation computation. In one embodiment, the far infrared sensing element can be implemented with thermopile structure. However, such implementation is not the only one and a limitation of the present invention. Further, the sizes of far infrared sensing element arrays 310_1-310_N in the far infrared sensor array integrated circuits 231_1-231_N are basically identical. In one embodiment, the far infrared sensor array integrated circuits 231_1-231_N may be applicable to detecting the light with wavelength longer than 3 μm.

Figure 4:
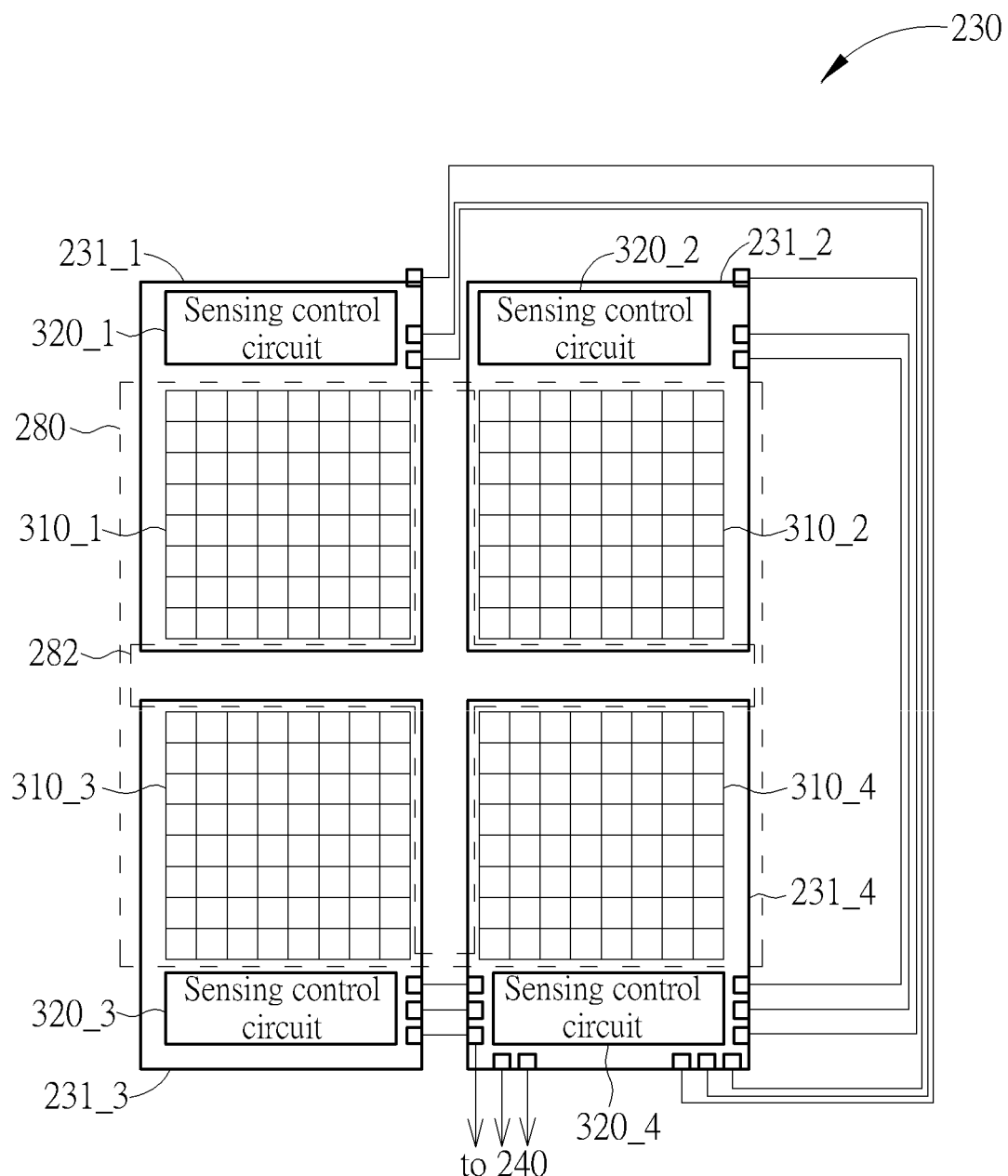
FIG. 4 illustrates a diagram of a far infrared sensor array integrated circuit combination according to one embodiment of the present invention.

FIG. 4 illustrates a plain view of structure of the far infrared sensor array integrated circuit combination 230 according to one embodiment of the present invention. As illustrated, the far infrared sensor array integrated circuit combination 230 is composed of far infrared sensor array integrated circuits 231_1-231_4. The far infrared sensor array integrated circuit 231_1 comprises a far infrared sensing element array 310_1 and a sensing control circuit 320_1. The far infrared sensor array integrated circuit 231_2 comprises a far infrared sensing element array 310_2 and a sensing control circuit 320_2; the far infrared sensor array integrated circuit 231_3 comprises a far infrared sensing element array 310_3 and a sensing control circuit 320_3; the far infrared sensor array integrated circuit 231_4 comprises a far infrared sensing element array 310_4 and a sensing control circuit 320_4. A valid sense region of the far infrared sensor array integrated circuit combination 230 is substantially equal to the area 280. Infrared light passing through the optical element 220 will be gathered onto the area 280. Subsequently, the far infrared sensing element arrays 310_1-310_4 generate corresponding sensed signals. Inside the area 280, there is an region 282 that is not covered with any sensing elements. Therefore, at least one of the sensing control circuits 320_1-320_4 employs the sensed signals of the sensing elements adjacent to the region 282, to perform a compensation computation, which generates estimated sensed signals regarding the region 282. In one embodiment, the compensation computation is an interpolation, which computes average values of the sensed signals of the sensing elements adjacent to the region 282. The average values will be used as sensed signals corresponding to the region 282.

The far infrared sensor array integrated circuits 231_1-231_N in the far infrared sensor array integrated circuit combination 230 are interconnected through wires. In one embodiment, the far infrared sensor array integrated circuits 231_1-231_N have bonding pads thereon. By means of wire bonding, the far infrared sensor array integrated circuits are interconnected. One of the far infrared sensor array integrated circuits 231_1-231_N is arranged for collecting and integrating sensed signals obtained from other far infrared sensor array integrated circuits, and accordingly, performs the compensation computation on these sensed signals to obtain the sensed signals corresponding to the region 282. Taking the embodiment of FIG. 4 as an example, the sensing control circuit 320_4 of the far infrared sensor array integrated circuit 231_4 is provided with a computation circuit 322_4, which is employed for collecting and integrating those sensed signals read by other far infrared sensor array integrated circuits. Additionally, through an input interface, bonding pads and wires that are coupled to the far infrared sensor array integrated circuits 231_1-231_3, the sensing control circuit 320_4 derives the sensed signals read by the sensing control circuit 320_1-320_3 corresponding to the far infrared sensing element arrays 310_1-310_3. Afterwards, the computation circuit 322_4 performs the compensation computation according to the sensed signals obtained from the far infrared sensing element arrays 310_1-310_4 and integrates the result of the compensation computation with the sensed signals, thereby obtaining 16×16 sensed results. Through an output interface, the bonding pads and wires that are connected to the circuit board 240, the sensed results are sent to external devices.

In one embodiment, the sensing control circuits 320_1-320_4 may have identical circuitry and manufactured by an identical process. During the process of integrating the far infrared sensor array integrated circuits 231_1-231_4 to form the far infrared sensor array integrated circuit combination 230, some functions providable by the sensing control circuits 320_1-320_3 may be disabled. In addition, some contacts of interfaces of the sensing control circuits 320_1-320_3 may not be coupled to the bonding pads of the far infrared sensor array integrated circuits 231_1-231_3. Specifically, each of the sensing control circuits 320_1-320_3 may include the computation circuit. However, after the far infrared sensor array integrated circuit combination 230 is formed, these computation circuits will be disabled. The sensing control circuits 320_1-320_3 may have the input/output interface of the width that is consistent with the width of the input/output interface of the sensing control circuit 320_4. However, after forming the far infrared sensor array integrated circuit combination 230, the sensing control circuits 320_1-320_3 only reserve a portion of the interface that is wide enough for outputting the sensed signals to the sensing control circuit 320_4. Such design thinking is to simplify design and manufacturing process of the far infrared sensor array integrated circuits 231_1-231_4. However, in some applications, in order to satisfy other design requirements, the sensing control circuit may have different circuitry and made by different manufacturing processes, which will be explained later.

Figure 5A:
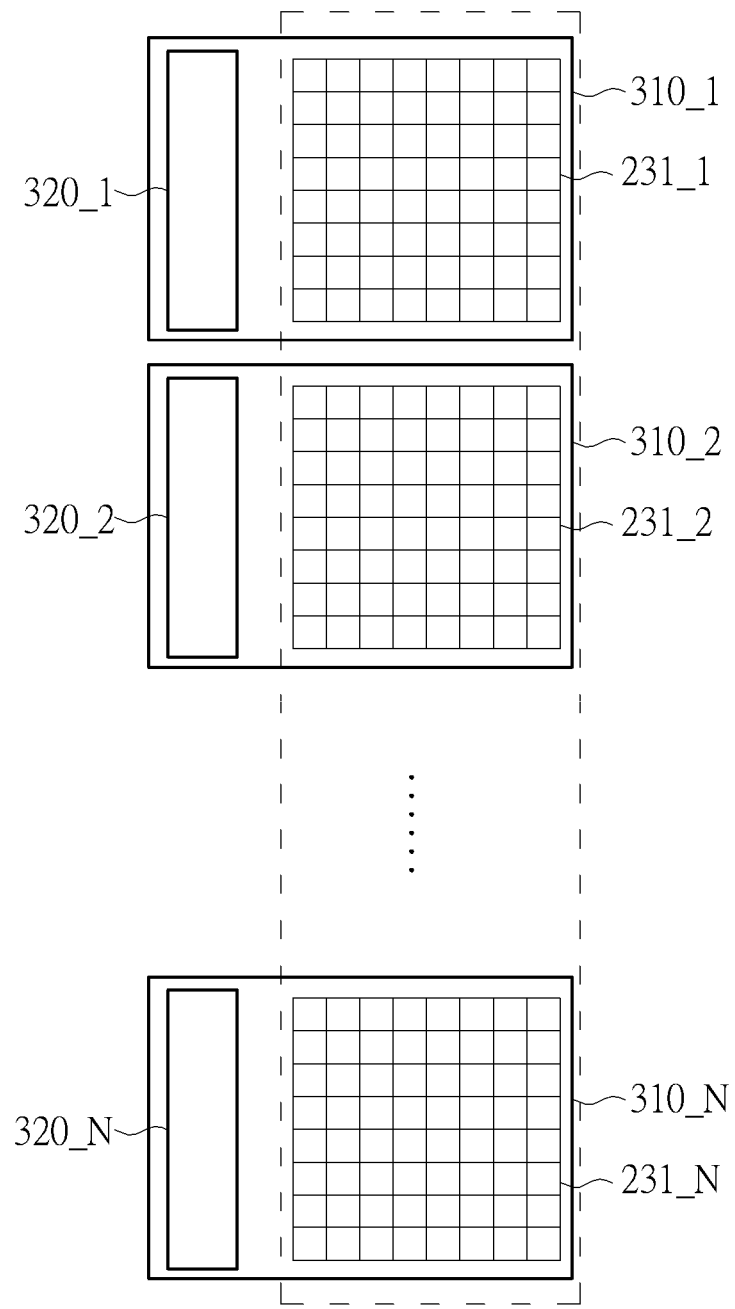
FIGS. 5A-5D illustrates diagrams of far infrared sensor array integrated circuit combinations according to various embodiments of the present invention.
Figure 5B:
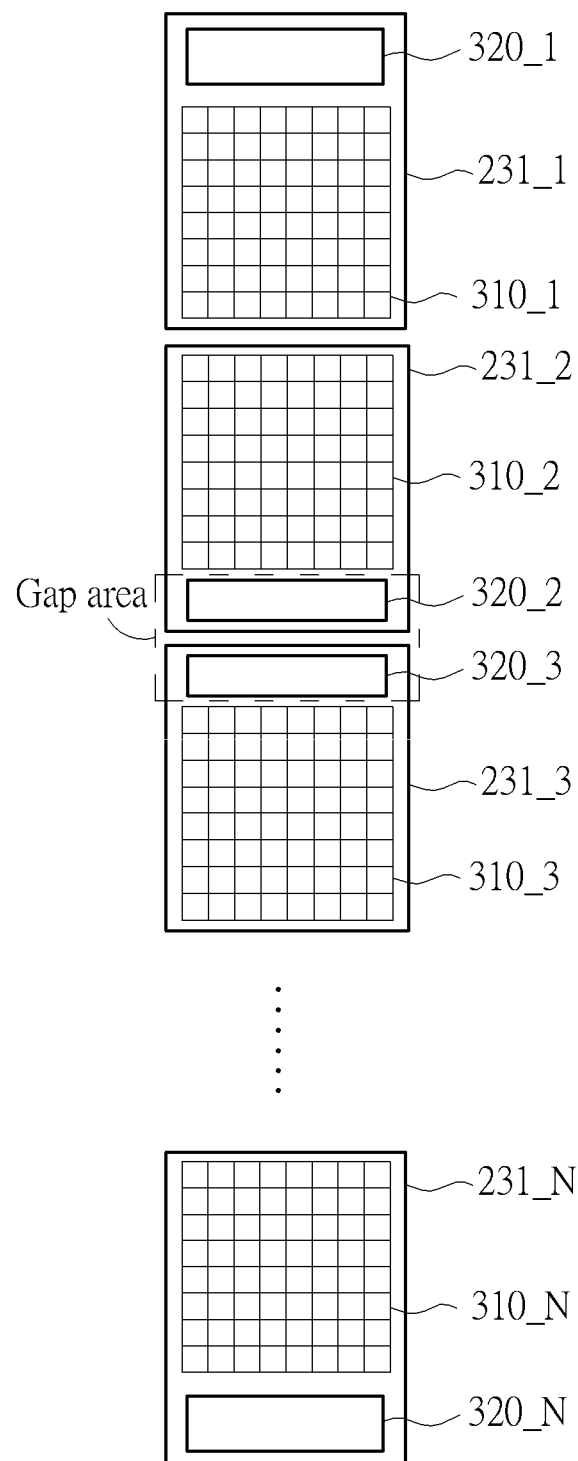
Figure 5C:
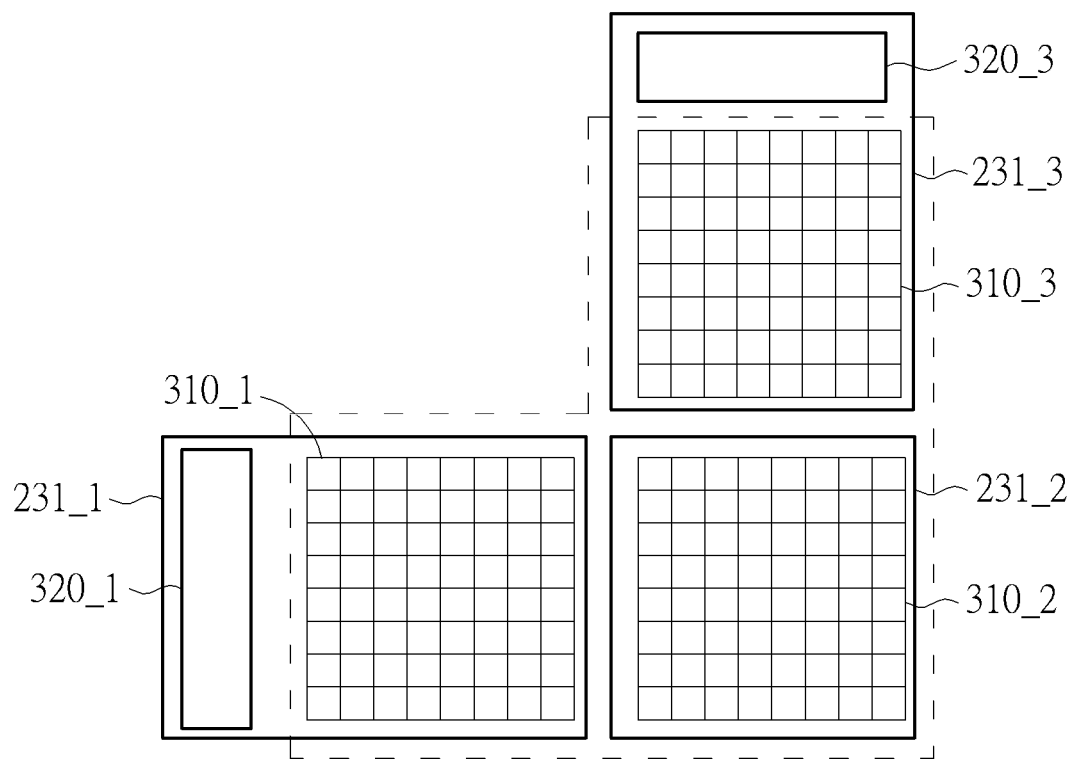
Figure 5D:
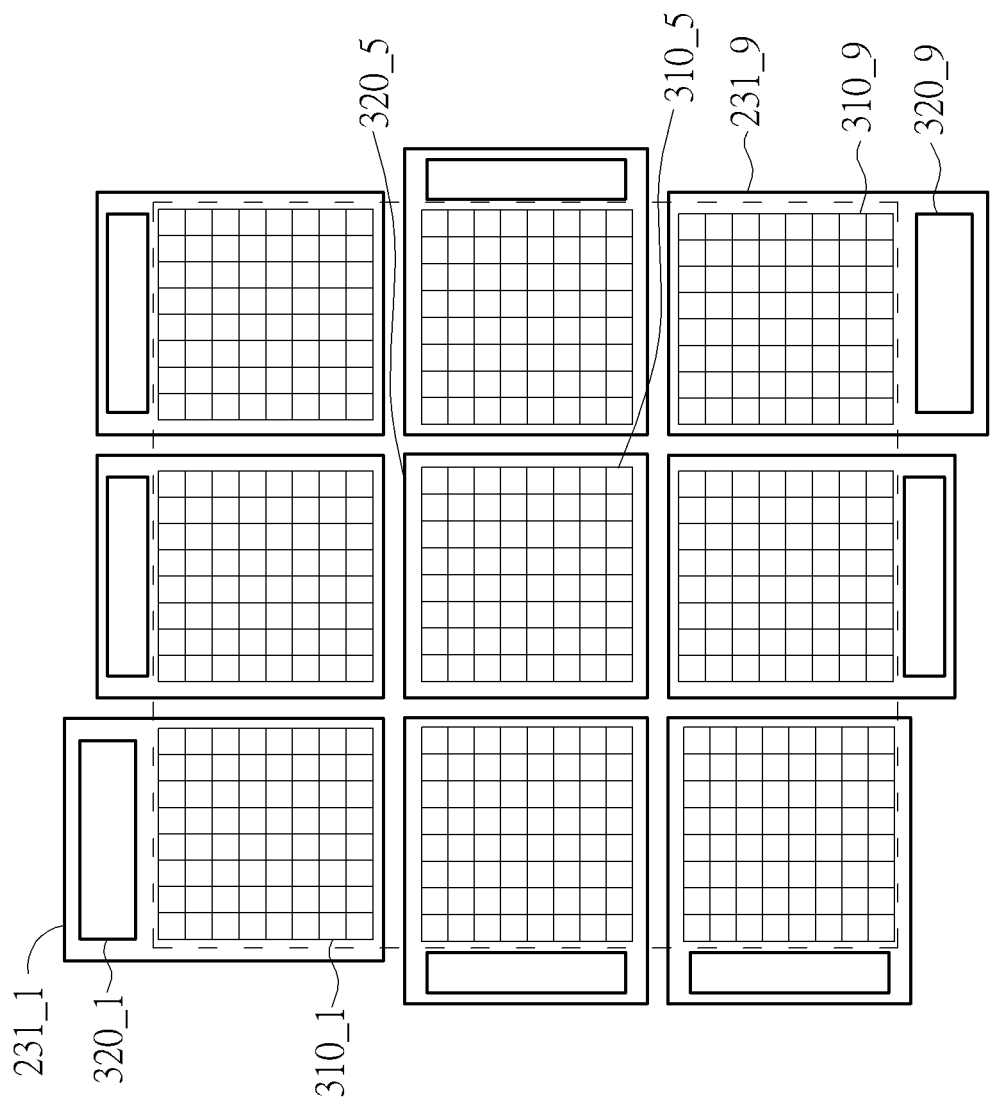

FIGS. 5A-5D illustrate different arrangements of the far infrared sensor array integrated circuits 231_1-231_N in the far infrared sensor array integrated circuit combination 230 according to various embodiments of the present invention. The far infrared sensor array integrated circuits 231_1-231_N may be in a side-by-side arrangement as shown by FIG. 5A or in a head-to-tail arrangement as shown by FIG. 5B. Alternatively, the far infrared sensor array integrated circuits 231_1-231_N may be arranged in a mixed arrangement as illustrated by FIG. 5C. In the arrangement shown by FIG. 5B, there are large gap areas between neighboring far infrared sensor array integrated circuits 231_1-231_N. Those large gap areas are not covered by the far infrared sensing element arrays, which causes the compensation computation to be more difficult and complicated. In order to overcome such problem, some of the far infrared sensor array integrated circuits 231_1-231_N, such as, the far infrared sensor array integrated circuits 231_2-231_3, comprise simplified sensing control circuits 320_2-320_3 whose circuit size is smaller. Compared to the sensing control circuit 320_1, the sensing control circuits 320_2-320_3 may not include the computation circuit for performing the compensation computation. The sensing control circuits 320_2-320_3 may only include circuit blocks for driving and reading the sensing element arrays 310_2-310_3. By scaling down the sizes of the sensing control circuits, the gap areas that are not covered by the far infrared sensing element arrays in specific arrangements. In the embodiment illustrated by FIG. 5C, the far infrared sensor array integrated circuits 231_2 does not include the sensing control circuit, driving and reading operations regarding the far infrared sensing element array 310_2 may be conducted by the sensing control circuits 320_1 and 320_3 of the far infrared sensor array integrated circuits 231_1 and 231_3. In the embodiment of FIG. 5D, the far infrared sensor array integrated circuit combination 230 include far infrared sensor array integrated circuits 231_1-231_9, where the far infrared sensor array integrated circuit 231_5 only include the far infrared sensing element array 310_5 but does not include the sensing control circuit. Sensed signals on the far infrared sensing element array 310_5 can be read by the sensing control circuits in other far infrared sensor array integrated circuits. Furthermore, the sensing control circuit 320_1 and 320_9 in the far infrared sensor array integrated circuits 231_1 and 231_9 may both have enabled computation circuit for performing compensation computation. The sensing control circuits of the far infrared sensor array integrated circuits 231_2-231_4 and 231_6-231_8 may not have the computation circuit, or their computation circuits are not enable. Alternatively, circuit blocks in the far infrared sensor array integrated circuits 231_2-231_4 and 231_6-231_8 that are intended for driving and/or reading operations may be disabled. These driving and/or reading operations are performed by the sensing control circuit 320_1 and 320_9 instead.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment. Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

In conclusion, by unifying the design and manufacturing of the far infrared sensor array integrated circuits, the sensors suppliers can easily manufacture the sensors with different dimensions to meet different customers' requirements. In addition, the far infrared sensor array integrated circuits of the present invention have good flexibility in the design of the sensing control circuit. Sensing control circuit of different far infrared sensor array integrated circuits may have identical circuitry in the design and manufacture stages. However, in the actual applications, some circuit blocks in the sensing control circuit may be disabled if not necessary. Furthermore, in order to realize special arrangements of the infrared sensor array integrated circuit combination, some far infrared sensor array integrated circuits may not include a sensing control circuit or include a smaller sensing control circuit with different circuitry. As a result, the flexibility and the efficiency of manufacturing the far infrared sensor package can be improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A far infrared sensor package, comprising:
a package body; and
a plurality of far infrared sensor array integrated circuits, disposed on a same plane and inside the package body, wherein each of the far infrared sensor array integrated circuits includes a far infrared sensing element array of a same size and the far infrared sensor array integrated circuits are manufactured by an identical process, wherein the far infrared sensor array integrated circuits do not share a common substrate; and each of the far infrared sensor array integrated circuits comprises a sensing control circuit, which comprises a multiplexer, an analog-to-digital converter, a register, a driver and a computation circuit, wherein the far infrared sensor array integrated circuits comprises a first far infrared sensor array integrated circuit and at least one second far infrared sensor array integrated circuit; a second sensing control circuit of each of the at least one second far infrared sensor array integrated circuit is connected to and receives/transmits signals from/to a first sensing control circuit of the first far infrared sensor array integrated circuit;
wherein the far infrared sensor array integrated circuits form an N×N circuit array, where N is an integer greater than or equal to 2, and the at least one second far infrared sensor array integrated circuit is (N^2)−1 second far infrared sensor array integrated circuits that are electrically connected directly to the first far infrared sensor array integrated circuit with their individual bonding pads and wires.

2. The far infrared sensor package of claim 1, further comprising:
an optical element, disposed above the plurality of far infrared sensor array integrated circuits and an opening of the package body, arranged to convert external thermal radiation to infrared light and guiding the infrared light onto a valid sense region of the plurality of far infrared sensor array integrated circuits.

3. The far infrared sensor package of claim 1, wherein the first sensing control circuit performs a compensation computation according to a plurality of sensed signals derived respectively from the plurality of far infrared sensing element arrays, wherein the compensation computation generates a plurality of estimated sensed signals corresponding to a sense region that is not covered by the far infrared sensor array integrated circuits.

4. The far infrared sensor package of claim 3, wherein the at least one second far infrared sensor array integrated circuit of the plurality of far infrared sensor array integrated circuits includes an far infrared sensing element array that is coupled to the first sensing control circuit; the first sensing control circuit is arranged to read a plurality of second sensed signals of the sensed signals from the far infrared sensing element array of the second far infrared sensor array integrated circuit, and performs the compensation computation according to the plurality of sensed signals.

5. The far infrared sensor package of claim 3, wherein the second sensing control circuit is arranged to read a plurality of second sensed signals of the sensed signals from a far infrared sensing element array of the second far infrared sensor array integrated circuit; the first sensing control circuit receives the plurality of second sensed signals from the second sensing control circuit and performs the compensation computation according to the plurality of sensed signals.

6. The far infrared sensor package of claim 1, wherein the far infrared sensor array integrated circuit is a thermopile sensing element integrated circuit.

7. A far infrared sensor array integrated circuit combination, comprising:
a first far infrared sensor array integrated circuit including a first far infrared sensing element array and a first sensing control circuit; and
a plurality of second far infrared sensor array integrated circuits, at least one including a second far infrared sensing element array and a second sensing control circuit;
wherein a size of the first far infrared sensing element array is substantially consistent with a size of the second far infrared sensing element array; and the first and second far infrared sensor array integrated circuits are manufactured by an identical process and are integrated to form the far infrared sensor array integrated circuit combination; and a function providable by the first sensing control circuit is different from functions providable by the second sensing control circuit; and the first far infrared sensor array integrated circuit and the second far infrared sensor array integrated circuits do not share a common substrate; and each of the first and the second sensing control circuit comprises a multiplexer, an analog-to-digital converter, a register, a driver and a computation circuit, wherein the second sensing control circuit of each of the plurality of second far infrared sensor array integrated circuits is connected to and receives/transmits signals from/to the first sensing control circuit of the first far infrared sensor array integrated circuit; wherein the first far infrared sensor array integrated circuit and the second far infrared sensor array integrated circuits form an N×N circuit array, where N is an integer greater than or equal to 2, and (N^2)−1 second far infrared sensor array integrated circuits are electrically connected directly to the first infrared sensor array integrated circuit with their individual bonding pads and wires.

8. The far infrared sensor array integrated circuit combination of claim 7, wherein the first sensing control circuit performs a compensation computation according to a plurality of sensed signal respectively derived from the first far infrared sensing element array and the second far infrared sensing element array, wherein the compensation computation generates a plurality of estimated sensed signals corresponding to a sense region that is not covered by the first far infrared sensor array integrated circuit and the second far infrared sensor array integrated circuits.

9. The far infrared sensor array integrated circuit combination of claim 8, wherein the second far infrared sensing element array is coupled to the first sensing control circuit, and the first sensing control circuit read a portion of the plurality sensed signal from the second far infrared sensing element array.

10. The far infrared sensor array integrated circuit combination of claim 8, wherein the second sensing control circuit reads a portion of the plurality of sensed signals from the second far infrared sensing element array of the second far infrared sensor array integrated circuit; the first sensing control circuit receives the portion of the plurality of sensed signals from the second sensing control circuit, and performs the compensation computation according to the plurality of sensed signals.

11. The far infrared sensor array integrated circuit combination of claim 7, where the first and the second far infrared sensor array integrated circuits are the thermopile sensor array integrated circuits.

* * * * *